No. 886,600. PATENTED MAY 5, 1908.
H. HAEBERLIN.
CLUTCH.
APPLICATION FILED OCT. 29, 1906. RENEWED SEPT. 24, 1907.
4 SHEETS—SHEET 1.
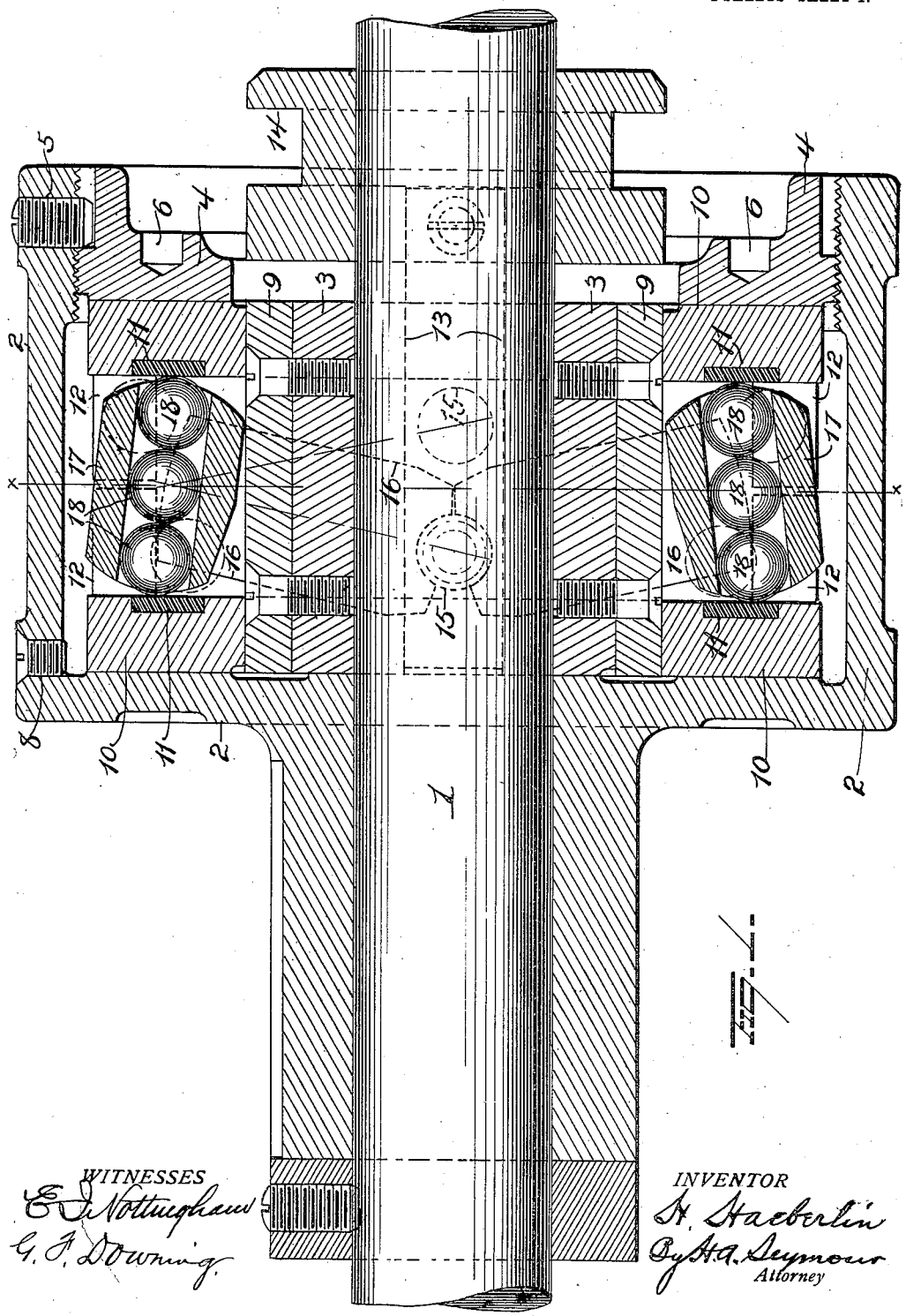
WITNESSES
E. J. Nottingham
G. F. Downing
INVENTOR
H. Haeberlin
By H. A. Seymour
Attorney No. 886,600. PATENTED MAY 5, 1908.
H. HAEBERLIN.
CLUTCH.
APPLICATION FILED OCT. 29, 1906. RENEWED SEPT. 24, 1907.
4 SHEETS—SHEET 2.
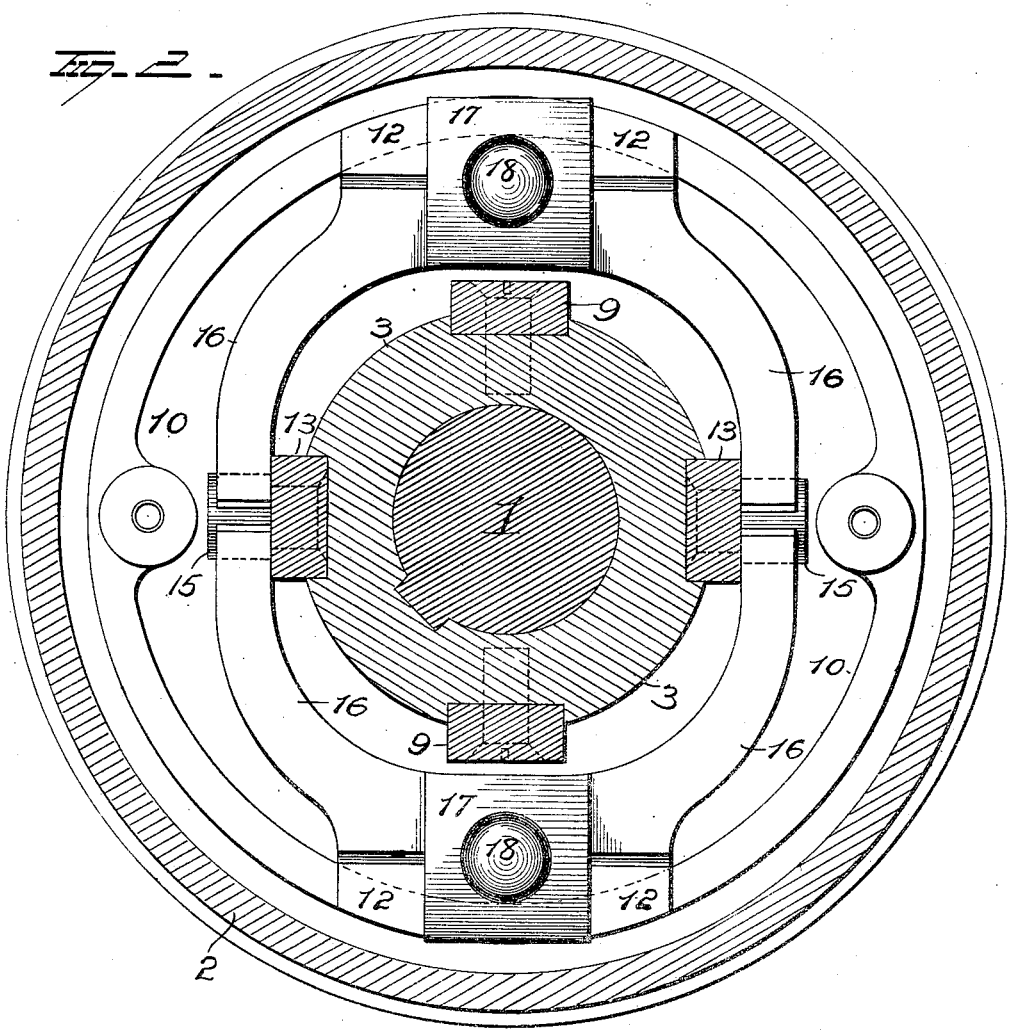
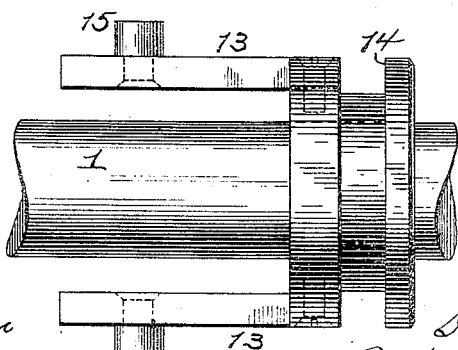
WITNESSES
E. J. Nottingham
G. F. Downing
INVENTOR
H. Haeberlin
By H. A. Seymour
Attorney

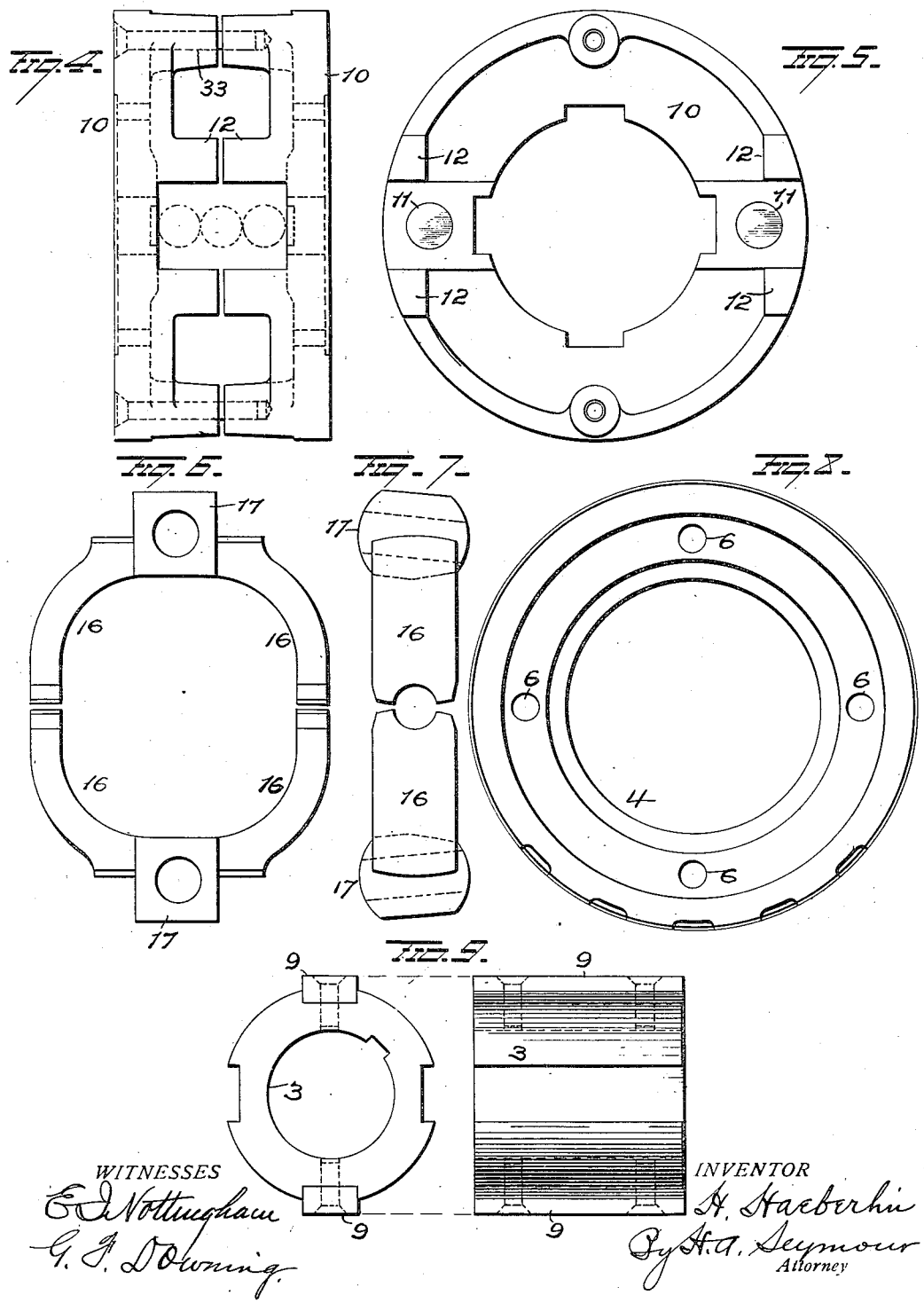

No. 886,600.
PATENTED MAY 5, 1908.
H. HAEBERLIN.
CLUTCH.
APPLICATION FILED OCT. 29, 1906. RENEWED SEPT. 24, 1907.
4 SHEETS—SHEET 4.
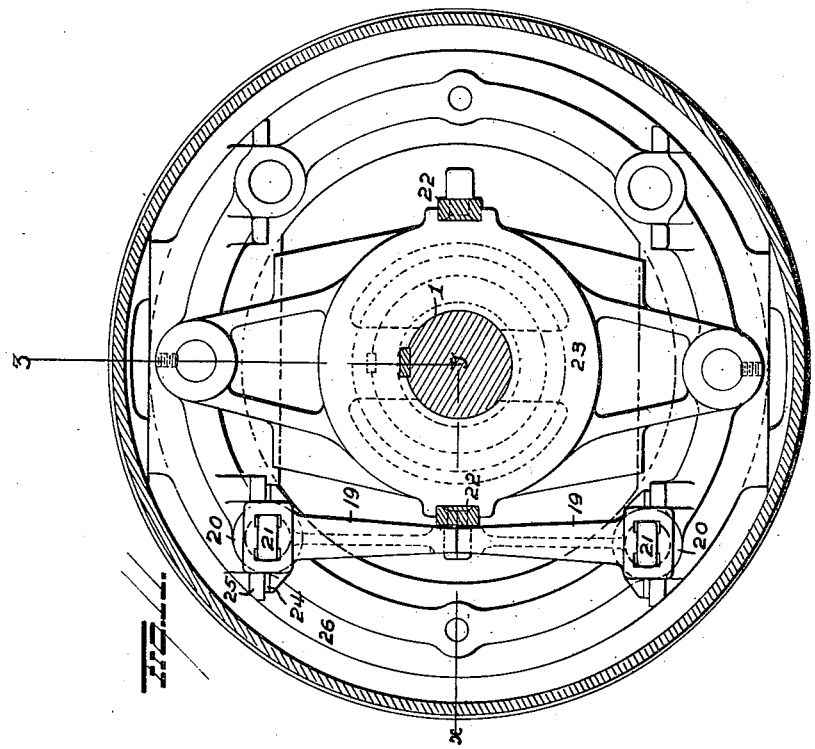
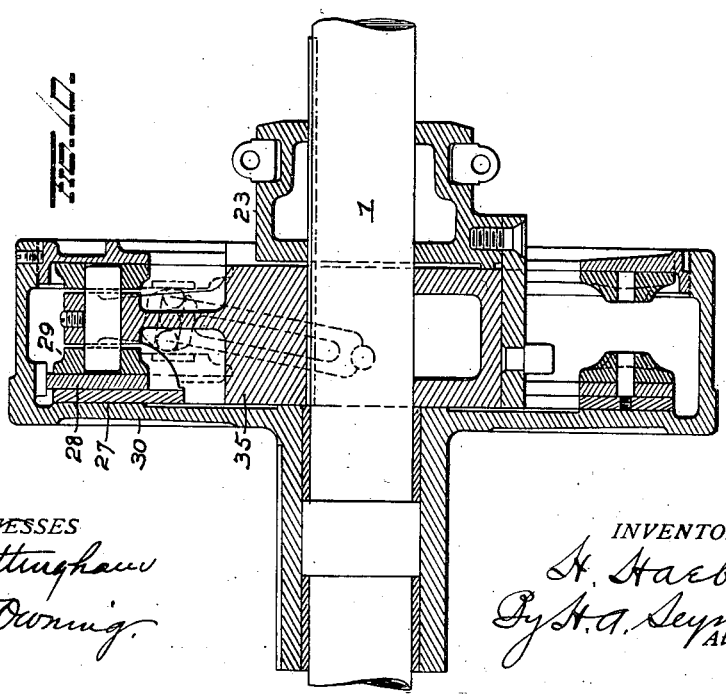
WITNESSES
E. J. Nottingham
G. J. Downing
INVENTOR
H. Haeberlin
By H. A. Seymour
Attorney

UNITED STATES PATENT OFFICE.

HERMANN HAEBERLIN, OF AKRON, OHIO, ASSIGNOR TO THE AKRON CLUTCH COMPANY, OF AKRON, OHIO, A CORPORATION OF OHIO.

CLUTCH.

No. 886,600.　　　　　Specification of Letters Patent.　　　　Patented May 5, 1908.

Application filed October 29, 1906, Serial No. 341,102. Renewed September 24, 1907. Serial No. 394,413.

*To all whom it may concern:*

Be it known that I, HERMANN HAEBERLIN, a resident of Akron, in the county of Summit and State of Ohio, have invented certain new and useful Improvements in Clutches; and I do hereby declare the following to be a full, clear, and exact description of the invention, such as will enable others skilled in the art to which it appertains to make and use the same.

My invention relates to improvements in clutches, the object of the invention being to provide improved means for locking the loose and fixed members together, which eliminates all sliding frictional contact, and the invention consists in certain novel features of construction and combinations and arrangements of parts as will be more fully hereinafter described and pointed out in the claims.

In the accompanying drawings, Figure 1 is a right angle longitudinal sectional view illustrating my improvements. Fig. 2 is a view on the line x—x of Fig. 1. Figs. 3, 4, 5, 6, 7, 8, and 9, are views of details of construction, and Figs. 10 and 11 are views illustrating a modification.

1 represents a shaft on which a cup-shaped member 2 is loosely mounted, and power may be taken off from the hub portion of this loose member, in any desired manner.

3 represents the fixed member of the clutch, which is keyed to shaft 1 and located in the cup portion of member 2. A friction plate 4 is screwed into the open end of cup or loose member 2, and is provided with grooves, in any of which, a screw 5 may be projected to lock the friction plate at any adjustment, and sockets 6 are provided in friction plate 4 to receive a spanner to adjust the plate to any degree of fineness. A screw 8 closes an opening in member 2, through which lubricant may be supplied to the clutch.

The fixed member 3 is provided at diametrically opposite points with longitudinal grooves to receive keys 9, locking friction disks 10 to turn with member 3 but free to slide thereon. These friction disks 10 are provided with insert plates 11, of hard metal, forming wearing surfaces, and serving to distribute the pressure throughout the disks, and the disks are made with inwardly projecting lugs 12, having flat inner faces, for a purpose which will hereinafter appear. The fixed member 3 is also made, at diametrically opposite points with longitudinal grooves receiving sliding bars 13 connected with and operated by a sliding sleeve 14 on shaft 1.

The bars 13 are made with openings to receive studs 15, having rounded heads lying in recesses in the ends of semi-circular arms or levers 16, the latter straddling member 3, and provided between their outer ends with blocks or carriers 17 made rigid with said arms or levers and located between the friction disks 10. Blocks or carriers 17 are made with longitudinal bores or openings forming casings for a number of balls or rollers 18. Three balls or rollers are shown, although any number, preferably an odd number, may be employed. The outer ends of the arms or levers form curved shoulders at the sides of the blocks or carriers 17 and these curved shoulders rock on bearings which the lugs 12 provide.

In the position shown in Fig. 1, the balls are tightly pressing the friction disks 10 against the loose member 2, to lock the latter to the fixed member 3, and compel them to turn together. To release the clutch, sleeve 14 is drawn outward, thus drawing the bars 13 outward, and swinging levers 16, causing the curved shoulders formed by the ends of the latter to rock or roll on lugs 12 of disks 10. The block or carrier is thus caused to rock or oscillate and change the angle of the line of balls with relation to shaft 1, and move the balls to the position shown in dotted lines; relieving pressure on the friction disks 10 to release the loose member. As the levers 16 swing, the balls will roll on each other and on the wearing plates 11, thus dispensing with any sliding frictional engagement during the operation of throwing the clutch in and out.

In assembling the clutch, a screw 33 is employed to secure the friction disks 10 together and hold them in proper alinement, but this screw is removed before the friction plate 4 is screwed into place.

In the modification illustrated in Figs. 10 and 11, I provide the clutch with four operating levers 19, carrying blocks 20, in which latter the balls or rollers 21 are located, and moved against or away from the friction disks, as clearly shown. The sliding bars 22, at opposite sides of the fixed member 3, each operate two of said levers 19, and the bars 22 are moved by sliding sleeves 23. The outer ends of the levers 19 are made with rounded shoulders 24 movable on lugs 25 of the friction disks 26. In order to increase the transmitting power of this modified form of clutch, two friction plates 27 and 28 are inserted between the friction disks 29 and the loose member 30. Plate 27 is forced to rotate with fixed member 31 and plate 28 rotated with loose member 30, all of which is clearly illustrated in the drawings.

A great many other changes might be made in the general form and arrangement of the parts described without departing from my invention, and hence, I do not restrict myself to the precise details set forth but consider myself at liberty to make such slight changes and alterations as fairly fall within the spirit and scope of my invention.

Having fully described my invention, what I claim as new and desire to secure by Letters-Patent is:—

1. In a clutch, the combination with fixed and loose members, of friction plates carried by one of said members and coöperating with the other member, a carrier disposed between said plates, rotatable engaging means mounted in said carrier and disposed to have rolling engagement with the friction plates when the carrier is oscillated and means for oscillating said carrier.

2. In a clutch, the combination with fixed and loose members, of friction plates carried by one of said members and coöperating with the other member, a carrier disposed between said plates, a series of rolling bodies mounted in said carrier between the friction plates and coöperating with the latter, and means for oscillating the carrier.

3. In a clutch, the combination with fixed and loose members, of friction plates carried by the fixed member and inclosed by and coöperating with the loose member, a carrier disposed between said plates, a series of contacting rolling bodies mounted in said carrier and coöperating with the friction plates when the carrier is oscillated, and means for oscillating the carrier.

4. In a clutch, the combination with fixed and loose members of friction plates carried by one of said members and coöperating with the other member, an oscillatory carrier disposed between said friction plates, a series of balls mounted in said carrier, the end balls of the series disposed to have rolling relation to the friction plates, and the intermediate ball of the series having rolling relation to the end balls, and means for oscillating the carrier.

5. In a clutch, the combination with fixed and movable members, and friction plates carried by one of said members and coöperating with the other member, of a carrier disposed between said friction plates, rotatable engaging means mounted in said carrier and coöperating with the friction plates, an arm or lever rigid with said carrier and having a curved shoulder at one end, a bearing on which said curved shoulder rocks, and means for oscillating said arm or lever and the carrier.

6. In a clutch, the combination with fixed and movable members and friction plates carried by one of said members and coöperating with the other member, of a carrier disposed between the friction plates, a series of rolling bodies mounted in said carrier and coöperating with the friction plates, an arm or lever rigid with each side of the carrier, and each arm or lever terminating in a curved end or shoulder alongside the carrier, and bearings on which said curved ends or shoulders rock, and means for oscillating said arms or levers.

7. In a clutch, the combination with fixed and movable members, and friction plates carried by one of said members and coöperating with the other member, of an oscillatory or rocking carrier disposed between said friction plates, rotatable engaging means mounted in said carrier and coöperating with the friction plates, a curved shoulder rigid with a side of said carrier, a bearing on which said curved shoulder rocks, and means for rocking or oscillating said carrier.

8. In a clutch, the combination of fixed and loose members, of friction plates keyed to the fixed member and located adjacent to the movable member, a lever, a block on said lever between the friction plates, a series of balls or rollers in an opening in said block, and means for moving the lever to force the friction plates tightly against the loose member by means of the balls, or release the friction plates from tight engagement with the loose member.

9. In a clutch, the combination with fixed and loose members, of friction disks keyed to the fixed member and located in proximity to the loose member, a lever, a block on said lever between the friction disks and having a longitudinal bore or opening therein, a series of balls in said opening in the block, means for moving the lever to force the friction disks apart and into locked engagement with the loose member by the action of the balls against the disks, or release the loose member when the lever is moved in the opposite direction.

10. In a clutch, the combination with a cup-shaped loose member, and a fixed member within the cup-shaped loose member, of friction disks keyed to slide on the fixed member and movable against the loose member, inwardly projecting lugs on the friction disks, levers having rounded ends movable against the lugs, blocks on said levers having longitudinal bores or openings, balls or rollers in said openings, and means for moving the levers to change the angle of the line of balls or rollers with relation to the fixed member or shaft to lock the members together or release the loose member.

11. In a clutch, the combination with a shaft, a fixed member secured thereon, and a loose cup-shaped member on the shaft and inclosing the fixed member, of friction disks keyed to slide on the fixed member, insert rings in the inner faces of the disks, levers between the disks, blocks on said levers having longitudinal bores or openings, balls in said openings to bear against the insert rings and force the friction disks against the loose member when the levers are moved to one position and release the loose member when moved to another position.

12. In a clutch, the combination with a shaft, a fixed member thereon, and a loose cup-shaped member on the shaft and around the fixed member, of friction disks keyed to slide on the fixed member, swinging levers between the disks, a series of balls or rollers carried by the levers and forced thereby against or away from the friction disks, a sliding sleeve on the shaft, bars secured to the sleeve and keyed to slide in grooves in the fixed member, studs connected with said bars and located in recesses in the ends of the levers to swing the levers when the sleeve is slid on the shaft.

13. In a clutch, the combination with a fixed member secured on its shaft, a loose member on the shaft and having a cup-shaped portion around the fixed member, of a plate screwed into the open end of the cup-shaped portion of the loose member and having grooves in its periphery, a screw in the loose member to be projected into any of the grooves to lock the plate at any adjustment, friction disks keyed on the fixed member, a lever, and a line of balls or rollers carried by the lever at right angles thereto and adapted to be moved by the lever at various angles relative to the shaft to force the friction disks against the loose member and plate.

14. In a clutch, the combination with a loose member mounted upon a rotatable element, shiftable members connected with and rotated by said element, a carrier disposed between said shiftable members, rotatable engaging means mounted in said carrier and disposed in rolling contact with respect to said shiftable members when the carrier is oscillated, and means for oscillating said carrier, causing thereby the moving of said shiftable members to clutching engagement with said loose member.

15. A clutch comprising a loose member adapted to be mounted upon a rotating element, shiftable members connected with and rotated by said element, a carrier disposed between said shiftable members, a series of rolling bodies mounted in said carrier between and coöperating with said shiftable members, and means for oscillating the carrier.

16. In a clutch, a loose member adapted to be mounted upon a rotating element, shiftable members connected with and rotated by said element, an oscillatory carrier disposed between and independent of said shiftable members, said carrier when oscillated in one direction adapted to move said shiftable members to clutching engagement with said loose member, and means for oscillating said carrier.

17. In combination, a loose member adapted to be mounted upon a rotatable element, a shiftable frictional member adapted to engage with said loose member, an oscillatory carrier mounted upon said element, rotatable engaging means mounted in said carrier and disposed in rolling contact with respect to said frictional member when the carrier is oscillated, and means for oscillating the carrier.

18. A clutch comprising a loose member adapted to be mounted upon a rotatable element, a shiftable member connected with and rotated by said element, a carrier mounted upon said rotatable element, disposed at one side of said shiftable member and oscillating in a longitudinal direction with respect to the longitudinal axis of said element, rotatable means mounted in the carrier and adapted to engage said frictional member when the carrier is oscillated, and means for oscillating said carrier.

In testimony whereof, I have signed this specification in the presence of two subscribing witnesses.

HERMANN HAEBERLIN.

Witnesses:
 C. R. QUINE,
 C. E. HUMPHREY.